United States Patent [19]

Burrus

[11] Patent Number: 4,491,572
[45] Date of Patent: Jan. 1, 1985

[54] PROCESS FOR PREPARING SULFUR DIOXIDE

[75] Inventor: Harry O. Burrus, Wilmington, Del.

[73] Assignee: E. I. Du Pont de Nemours and Company, Wilmington, Del.

[21] Appl. No.: 546,153

[22] Filed: Oct. 27, 1983

Related U.S. Application Data

[63] Continuation-in-part of Ser. No. 448,609, Dec. 10, 1982, abandoned, which is a continuation of Ser. No. 188,240, Sep. 26, 1980, abandoned, which is a continuation-in-part of Ser. No. 106,253, Dec. 21, 1979, abandoned.

[51] Int. Cl.³ .............................................. C01B 17/48
[52] U.S. Cl. .................................................... 423/539
[58] Field of Search ............ 423/539, 539 A; 203/34, 203/35, 94

[56]  References Cited

U.S. PATENT DOCUMENTS

| | | | |
|---|---|---|---|
| 1,896,483 | 2/1933 | Dohse | 423/539 A |
| 2,813,006 | 11/1957 | Hayworth et al. | 423/539 A |
| 2,813,007 | 11/1957 | Hall et al. | 423/539 A |
| 3,257,174 | 6/1966 | Fournel | 423/539 A |
| 3,325,248 | 6/1967 | Fournel | 423/539 A |
| 4,031,191 | 6/1977 | Burrus | 423/539 A |
| 4,053,573 | 10/1977 | Harrer et al. | 423/539 A |
| 4,175,112 | 11/1979 | Lusk et al. | 423/539 A |

FOREIGN PATENT DOCUMENTS

| | | | |
|---|---|---|---|
| 222136 | 7/1962 | Austria | 423/539 A |
| 705826 | 3/1965 | Canada | 423/539 A |
| 477364 | 8/1969 | Switzerland | 423/539 A |

OTHER PUBLICATIONS

Perry et al., Chemical Engineers Handbook Fifth edition, McGraw Hill Book Co., NY, NY, 1973, Chapter 13 (Distillation).

Primary Examiner—Gary P. Straub

[57]  ABSTRACT

Sulfur dioxide is prepared by reacting sulfur with sulfur trioxide in a medium which is sulfuric acid containing 10–65% by weight of sulfur trioxide, and which is held at a temperature of 100–150° C.

4 Claims, 1 Drawing Figure

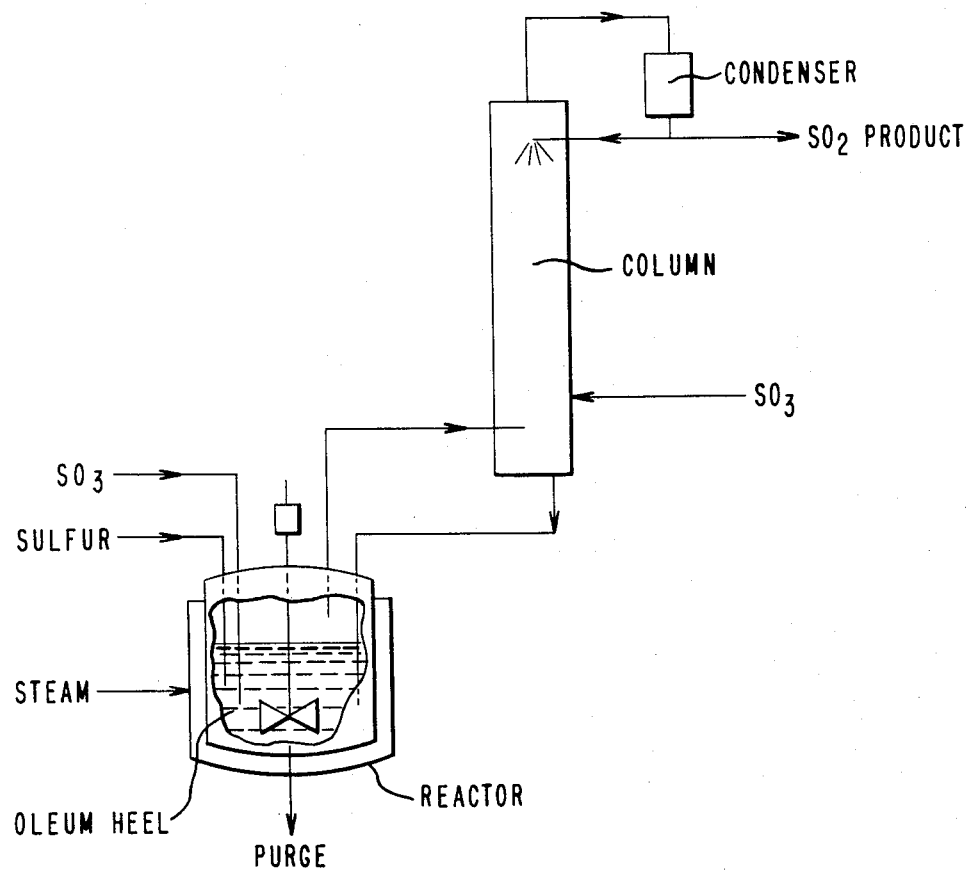

PROCESS FOR PREPARING SULFUR DIOXIDE

CROSS-REFERENCE TO RELATED APPLICATIONS

This application is a continuation-in-part of application Ser. No. 448,609, filed Dec. 10, 1982, as a continuation of application Ser. No. 188,240, filed Sept. 26, 1980, as a continuation-in-part of application Ser. No. 106,253, filed Dec. 21, 1979, all now abandoned.

DESCRIPTION

TECHNICAL FIELD

This invention relates to a process for preparing sulfur dioxide. It is more particularly directed to a process in which sulfur dioxide is prepared by the reaction of sulfur and sulfur trioxide in a medium which is sulfuric acid containing 10–65% by weight of sulfur trioxide (oleum).

BACKGROUND ART AND SUMMARY OF THE INVENTION

The preparation of sulfur dioxide by the reaction of sulfur and sulfur trioxide in an oleum medium is shown in Swiss Pat. No. 477,364. The reaction is carried out at a temperature of 40°–50° C. and is said to produce sulfur dioxide having a purity of over 99.5% and that this purity can be raised to 99.95% by passing the sulfur dioxide through a secondary reactor filled with sulfur particles. Sulfur dioxide of this purity does not meet most commercial specifications and must be further refined for most purposes.

It has now been found, according to the invention, that by raising the temperature at which the reaction is run to 100°–150° C. the rate of the reaction is greatly increased, and that this, together with rectification of the reactor effluent, raises the purity of the sulfur dioxide product to a level which permits it to be used directly in most commercial applications without further purification.

To have these advantages result from raising the reaction temperature is completely surprising because the Swiss patent tells us that at temperatures of 40°–50° C., the reaction proceeds just as quickly as it does at, for example, 90° C.

DESCRIPTION OF THE DRAWING

The drawing is a flow chart of the process of the invention.

DETAILED DESCRIPTION

The process of the invention will be described with reference to the Drawing.

The reaction takes place in a heel of oleum. By "oleum" is meant sulfuric acid containing 10–65%, preferably 15–40%, even more preferably 20–30%, by weight, of sulfur trioxide. This heel acts as a medium for the reaction.

The starting materials for the process are sulfur trioxide and sulfur. The $SO_3$ is fed to the reaction medium as a liquid and is normally at ambient temperature. The $SO_3$ may contain a stabilizer to prevent it from polymerizing into solid form.

The sulfur is fed to the reaction medium in the molten state, i.e., at a temperature of 125°–145° C., and may contain the usual impurities associated with commercially available sulfur.

Initially the reactor is filled with sufficient oleum to initiate the reaction. In operation, the $SO_3$ and sulfur are fed into the reaction medium at a rate such that the volume of the reaction mass remains about constant. The feed is also regulated so that the sulfur and $SO_3$ are fed into the reaction medium in about stoichiometric amounts.

The reactor can be heated by any suitable means. In the Drawing, the reactor has a jacket into which steam is fed to control the temperature of the reaction medium. The reactor also has suitable means for stirring to insure mixing of the reactants.

The oleum in the reactor is maintained at a temperature of 100°–150° C., preferably 120°–150° C. The reactor and a condenser are maintained at the autogenous pressure of the $SO_2$ gas produced by the reaction, i.e., within the range of 483–3447 kPa gauge (70–500 psig), preferably 552–1724 kPa (80–250 psig). The pressure can be maintained at the desired level by adjusting the flow of cooling water to the condenser in the rectification step of the process.

The reaction is illustrated by the following equation:

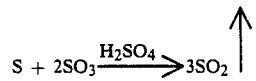

That reaction takes place in two steps, thus:

  (1)

  (2)

The reaction produces a stream of gaseous $SO_2$ which contains some $SO_3$. This stream is withdrawn from the top of the reactor. A purge of sulfonated hydrocarbons produced from the organic impurities in the sulfur can be taken from the bottom of the reactor to prevent their buildup.

The $SO_2$ is then passed to a rectification column, which can be part of the reactor or separate, as shown. In this column, $SO_3$ present in the $SO_2$ is removed. Normally, a column packed with ceramic saddles is used to provide the intimate mixing necessary. Within the column, the gaseous $SO_2$ is fed countercurrent to a liquid reflux stream. The contact between the two streams takes place at 35°–110° C., preferably 45°–80° C., and under the autogenous pressure of the $SO_2$, i.e., 483–3447 kPa (gauge). This contact can reduce the $SO_3$ content of the $SO_2$ gas stream to a very small amount, e.g., less than 1 ppm. The liquid stream from the bottom of the column, containing $SO_2$–$SO_3$, is fed back to the reactor.

The purified $SO_2$ gas is taken off at the top of the column and fed to a condenser. In this condenser, the $SO_2$ is condensed to a liquid by indirect contact with cooling water. The liquid $SO_2$ is then drawn off as a product, with a portion being fed to the column as reflux. The reflux ratio will normally be 0.5–2.

One of the advantages of the process of the invention is that it produces extremely pure $SO_2$ without use of additional purification steps.

EXAMPLE

Into a reactor having a holdup of 95 liters are fed 181.4 kg of 20% oleum, to form a heel. The reactor is heated to 150° C. by a steam jacket and is pressurized to 1380 kPa (200 psig). Into the reactor are fed 113.4 kg/hour of liquid $SO_3$ and 22.68 kg/hour of molten sulfur at 140° C. The reaction mass is agitated at the rate of 6.5 HP/3785 liters.

The gaseous $SO_2$ produced is fed to a column packed with 3.05 meters of ceramic "Intalox" saddles. The column is operated at 72° C. and 1380 kPa (200 psig), and has a reflux ratio of 0.7. The gaseous $SO_2$ taken from the column is condensed, part is refluxed and the rest removed as product.

I claim:

1. In a process for preparing sulfur dioxide wherein stoichiometric amounts of liquid sulfur and liquid sulfur trioxide are continuously added to a reaction medium which is sulfuric acid containing 10–65%, by weight, of sulfur trioxide, the improvements which permit production of extremely pure sulfur dioxide and comprise
   (a) maintaining the reaction medium at a temperature of 100°–150° C. and a pressure of 483–3447 kPa during the reaction,
   and
   (b) withdrawing the product sulfur dioxide from the reaction medium and rectifying it in a column, countercurrent to a reflux stream at a reflux ratio of 0.5–2, at a temperature of 35°–110° C. and a pressure of 483–3447 kPa gauge.

2. The process of claim 1 in which the reaction medium is held at 120°–150° C.

3. The process of claim 1 in which the medium is sulfuric acid containing 15–40% oleum.

4. The process of claim 1 in which the medium is sulfuric acid containing 20–30% oleum.

* * * * *